(12) United States Patent
Vijayarangan

(10) Patent No.: US 8,649,508 B2
(45) Date of Patent: Feb. 11, 2014

(54) SYSTEM AND METHOD FOR IMPLEMENTING ELLIPTIC CURVE SCALAR MULTIPLICATION IN CRYPTOGRAPHY

(75) Inventor: Natarajan Vijayarangan, Andhra Pradesh (IN)

(73) Assignee: Tata Consultancy Services Ltd. (IN)

( * ) Notice: Subject to any disclaimer, the term of this patent is extended or adjusted under 35 U.S.C. 154(b) by 946 days.

(21) Appl. No.: 12/286,396

(22) Filed: Sep. 29, 2008

(65) Prior Publication Data

US 2009/0103717 A1    Apr. 23, 2009

(30) Foreign Application Priority Data

Oct. 22, 2007    (IN) .................. 2087/MUM/2007

(51) Int. Cl.
| | |
|---|---|
| *H04K 1/00* | (2006.01) |
| *H04L 9/00* | (2006.01) |
| *H04L 9/28* | (2006.01) |
| *H04L 9/30* | (2006.01) |
| *G06F 7/00* | (2006.01) |
| *G06F 1/02* | (2006.01) |
| *G06F 7/58* | (2006.01) |
| *G06F 7/38* | (2006.01) |
| *G06F 17/10* | (2006.01) |
| *G06F 15/00* | (2006.01) |
| *G06G 7/34* | (2006.01) |
| *G06G 7/38* | (2006.01) |
| *G06F 9/00* | (2006.01) |
| *G06F 9/44* | (2006.01) |

(52) U.S. Cl.
USPC ............. 380/28; 380/29; 380/30; 380/59; 708/207; 708/250; 708/277; 708/290; 708/308; 708/446; 708/512; 708/514; 708/523; 708/603; 708/800; 708/801; 708/802; 712/1; 712/2; 712/3; 712/4; 712/5; 712/6; 712/7; 712/23; 712/220; 712/221; 712/222

(58) Field of Classification Search
USPC ........ 380/28–30, 59; 708/207, 250, 277, 290, 708/308, 446, 512, 514, 523, 603, 708/800–802; 712/1–7, 23, 220–222
See application file for complete search history.

(56) References Cited

U.S. PATENT DOCUMENTS

| | | | |
|---|---|---|---|
| 2005/0135605 A1* | 6/2005 | Dimitrov et al. | 380/28 |
| 2008/0021947 A1* | 1/2008 | Sinha et al. | 708/620 |
| 2009/0323933 A1* | 12/2009 | Longa et al. | 380/30 |

OTHER PUBLICATIONS

R. Barua, S. K. Pandey, R. Pankaj; Efficient Window-Based Scalar Multiplication on Elliptic Curves Using Double-Base Number System, 2007 Indocrypt, LNCS 4859, pp. 351-360.*
V. V Berthe, L. Imbert; On Converting Numbers to the Double-Base Number System, 2004, hal.archives-ouvertes.fr, LIRMM, CNRS UMR 5506, pp. 1-9.*
V. Dimitrov, L. Imbert, P. K. Mishra, Efficient and Secure Elliptic Curve Point Multiplication Using Double-Base Chains, 2005, ASIACRYPT, LNCS 3788, pp. 59-79.*

(Continued)

*Primary Examiner* — Thuha T. Nguyen
*Assistant Examiner* — Tariq Najee-Ullah
(74) *Attorney, Agent, or Firm* — Robert Plotkin, P.C.

(57) ABSTRACT

A system and method for implementing the Elliptic Curve scalar multiplication method in cryptography, where the Double Base Number System is expressed in decreasing order of exponents and further on using it to determine Elliptic curve scalar multiplication over a finite elliptic curve.

12 Claims, 7 Drawing Sheets

(56) References Cited

OTHER PUBLICATIONS

Figure 1:
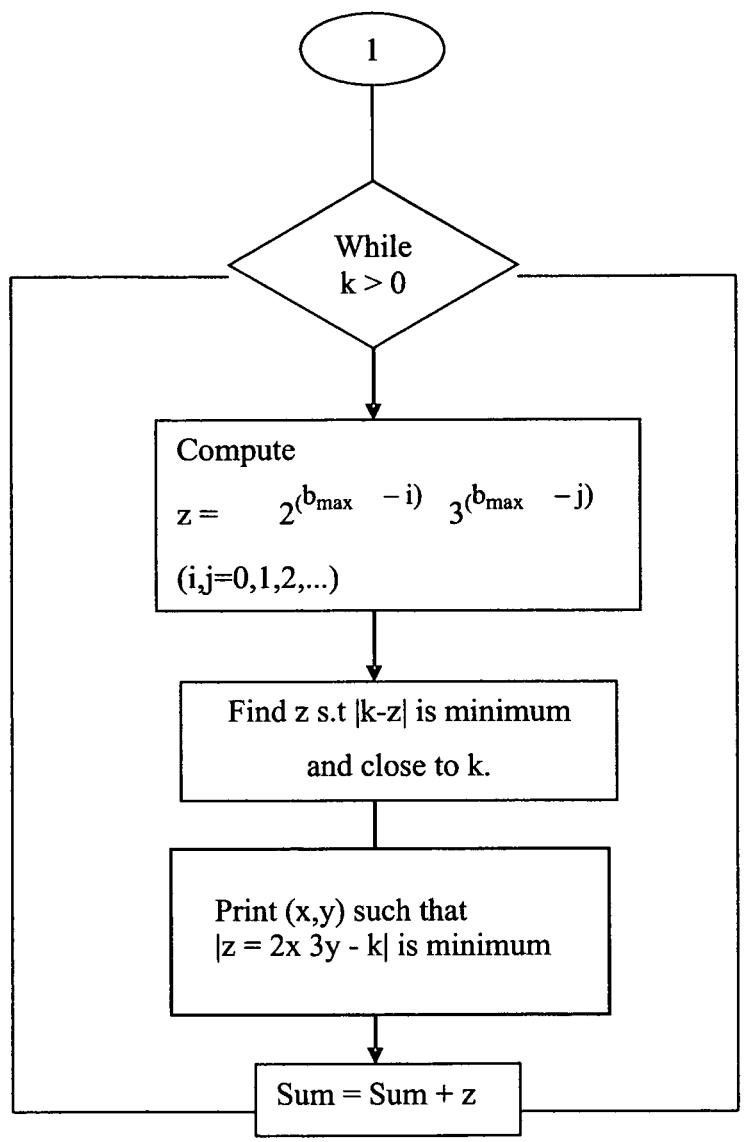

C. Doche, L. Imbert, Extended Double-Base Number System with Applications to Elliptic Curve Cryptography, 2006, INDOCRYPT 2006, LNCS 4329, pp. 335-348.*

P. K. Mishra, V. Dimitrov, Efficient Quintuple Formulas for Elliptic Curves and Efficient Scalar Multiplication Using Multibase Number Representation, 2007, ICS 2007, LNCS 4779, pp. 390-406.*

R. Muscedere, V.S. Dimitrov, G.A. Jullien, W.C. Miller, Efficient Conversion From Binary to Multi-Digit Multi-Dimensional Logarithmic Number Systems using Arrays of Range Addressable Look-Up Tables, 2002, IEEE, pp. 1-9.*

K.W. Wong, E. C.W. Lee, L.M. Cheng, X. Liao, Fast Elliptic Scalar Multiplication using New Double-base Chain and Point Halving, 2006, Elsevier, pp. 1-15.*

Doche et al, "Extended Double-Base Number System with Applications to Elliptic Curve Cryptography," 2006, INDOCRYPT 2006, LNCS 4329, pp. 335-348.*

Dimitrov et al, "Efficient and Secure Elliptic Curve Point Multiplication Using Double-Base Chains." 2005, ASIA CRYPT 2005, LNCS 3788, pp. 59-78.*

Doche et al, "Double-Base Number System for Multi-scalar Multiplications," 2009, EUROCRYPT 2009, LNCS 5479, pp. 502-517.*

* cited by examiner

SYSTEM AND METHOD FOR IMPLEMENTING ELLIPTIC CURVE SCALAR MULTIPLICATION IN CRYPTOGRAPHY

FIELD OF INVENTION

The present invention is in the field of cryptography.
Particularly, the invention relates to the use of Elliptic Curve scalar multiplication in cryptography.

BACKGROUND OF INVENTION

Elliptic Curve Cryptography (ECC) was proposed by N. Koblitz and V. Miller independently. ECC has obtained a lot of applications because of smaller key-length and increased theoretical robustness. In ECC, scalar multiplication (or point multiplication) is the operation of calculating an integer multiple of an element in additive group of elliptic curve. In other words, it is a computation of kP for any integer k and a point P on the elliptic curve. To compute EC scalar multiplications, one can easily adapt historical exponentiation methods to scalar multiplication, replacing multiplication by addition and squaring by doubling.

In ECC, elliptic curves over finite fields are used to implement ECDSA and ECE algorithms. There is no known subexponential method and system to solve the elliptic curve discrete algorithm so that the elliptic curves are secure and safe. It is known that an important core operation in the elliptic curves is scalar multiplication. For the last couple of years, many methods have been proposed to reduce the computational complexity of EC scalar multiplications.

PRIOR ART

Elliptic Curve Cryptography (ECC) was proposed by N. Koblitz and V. Miller independently. ECC has quickly received a lot of attention because of smaller key-length and increased theoretical robustness.

For last couple of years, DBNS has been proposed by many authors. Mathieu Ciet and Francesco Sica published a paper "An Analysis of Double Base Number Systems and a Sublinear Scalar Multiplication Algorithm" which produces an efficient algorithm for DBNS to compute nP on some supersingular elliptic curves of characteristic 3. This DBNS representation does not express the exponents of 2 and 3 in decreasing order.

V. S. Dimitrov, L. Imbert, and P. K. Mishra published a paper "Fast elliptic curve point multiplication using double-base chains". This paper has provided an EC scalar multiplication algorithm.

U.S. Pat. No. 6,252,959 by Christof Paar discloses a method of point multiplier implementation that reduces the number of point doubling operations. It further proposes a point doubling method for elliptic curve cryptosystems in which $2^k P=(X_k, y_k)$ is directly calculated from $P=(x,y)$ without computing intermediate points such as 2P, 4P, etc. The advantage in this direct calculation technique is that the number of inverses in the underlying field $GF(2^k)$ is reduced. This increases the cost. In most implementations, the number of multiplications is increased, and hence increasing complexity and decreasing efficiency. This is based upon the recognition that for most practical applications, the inversion is by far the most expensive operation to perform of the inversion, multiplication, addition, and squaring in the point doubling operations U.S. Pat. No. 6,263,081 by Atsuko Miyaji discloses a method of implementing point multiplication, in software using certain pre-computations.

U.S. Pat. No. 6,490,352 by Richard Schroeppel discloses an apparatus for operating a cryptographic engine that may include a key generation module for creating key pairs for encrypting substantive content to be shared between two users over a secured or unsecured communication link.

United States Patent No. 20070064931 by Bin Zhu discloses systems and methods configured for recoding an odd integer and elliptic curve point multiplication, having general utility and also specific application to elliptic curve point multiplication and cryptosystems.

U.S. Pat. No. 7,024,559 Jerome A. Solinas discloses a method of generating and verifying a cryptographic digital signature using joint sparse expansion.

U.S. Pat. No. 7,079,650 by Erik Knudsen discloses a cryptographic method between two entities exchanging data via a non-secure communication channel.

Each of the aforementioned prior art lacks its applications wherein fast processes are required with an optimum solution.

SUMMARY OF INVENTION

This invention envisages a system and method for implementing the Elliptic Curve scalar multiplication method in cryptography. The present invention is to find out an approximation for DBNS, which uses to compute EC scalar multiplication. Due to this invention, the performance of ECDSA and ECE can be speeded up.

Number Theory and Cryptography are based on mathematical problems that are considered difficult to solve. In the theory of Double Base Number System (DBNS)/Multiple Base Number System (MBNS), finding the best approximation for a given integer is a difficult problem.

Double-base number system (DBNS) is a representation scheme in which every positive integer, n, is represented as the sum or difference of 2-integers. 2-integers are numbers of the form $2^a 3^b$. In the similar manner, MBNS expresses any positive integer in the form of $2^a 3^b 5^c 7^d \ldots p^t$ (where p is prime).

This invention envisages in accordance with envisages the use of DBNS (Double Base Number Systems) and MBNS (Multi Base Number Systems) methods to reduce the computational complexity of EC scalar multiplications.

In accordance with the system and method of this invention DBNS is used to devise efficient steps to express a given integer n in decreasing order. These steps can be applied to compute EC scalar multiplication, with improved performance of the Elliptic Curve Digital Signature Algorithm (ECDSA) and Elliptic Curve Encryption (ECE).

In accordance with this invention there is provided an approximation, which expresses any integer n in the form of DBNS with decreasing order of exponents. The approximation is used to compute Elliptic curve scalar multiplication. It has a lot of applications in ECDSA and ECE.

Therefore in accordance with this invention there is provide a method and a system for designing a new Double Base Number System representation in decreasing order of exponents.

Typically, the DBNS representation can write the representation in an efficient way. Sometimes, the DBNS writes with repeated summands. In accordance with a preferred embodiment of the invention, in the event that there exists a summand with repetition, the summand never appears more than two.

Typically, the DBNS representation as defined by a first aspect of the invention use:

$$b_{max}=\min(b_1,(\lfloor \log_2 k \rfloor+1))$$

and $t_{max}=\min(t_1,(\lfloor \log_3 k \rfloor+1))$.

where $b_{max}$ and $t_{max}$ are used to optimize DBNS summands.

In accordance with another aspect of the invention there is provided a method for estimating Double Base Number System (DBNS) with decreasing order of exponents comprising the steps
  (a) Inputting a positive integer n denoted by k
  (b) Extracting the sequence of exponents $(b_m, t_m)$ (such that $b_1 \geq b_2 \geq \ldots \geq b_m \geq 0$, and $t_1 \geq t_2 \geq \ldots \geq t_m \geq 0$) leading to one DBNS representation of n
where exponents are expressed in the decreasing order with the help of $b_{max}$ and $t_{max}$ computations.

In accordance with one aspect of the invention the steps include a method to compute EC scalar multiplication using Algorithm 1 as shown in the accompanying drawings.

In accordance with another aspect of the invention there is provided a method of preforming Elliptic curve scalar multiplication nP (where n is the given integer and P is an arbitrary point of Elliptic curve) comprising the steps
  (a) Receiving the Double Base Number System (DBNS) sum
  (b) computing $R_{sum}$ separately for the DBNS sum consisting of repeated exponents
  (c) determining the Elliptic curve point nP∈E(F), where E(F) is an elliptic curve over a prime/binary field F In the above Elliptic curve scalar computation, the DBNS sum expresses any integer n in the form of $2^a 3^b$. Sometimes, the DBNS may express repetitive summands, which are separately calculated and stored in $R_{sum}$. Finally, the DBNS sums up repetitive and non-repetitive summands and produces the output.

Still, it is an open problem (P-type or NP-type) to express a given integer n which can be uniformly expressed as a DBNS without repetition of summands.

The features and advantages of the present invention will become more apparent from the ensuing detailed description of the invention taken in conjunction with the accompanying drawings.

BRIEF DESCRIPTION OF THE ACCOMPANYING DRAWINGS

Figure 2:
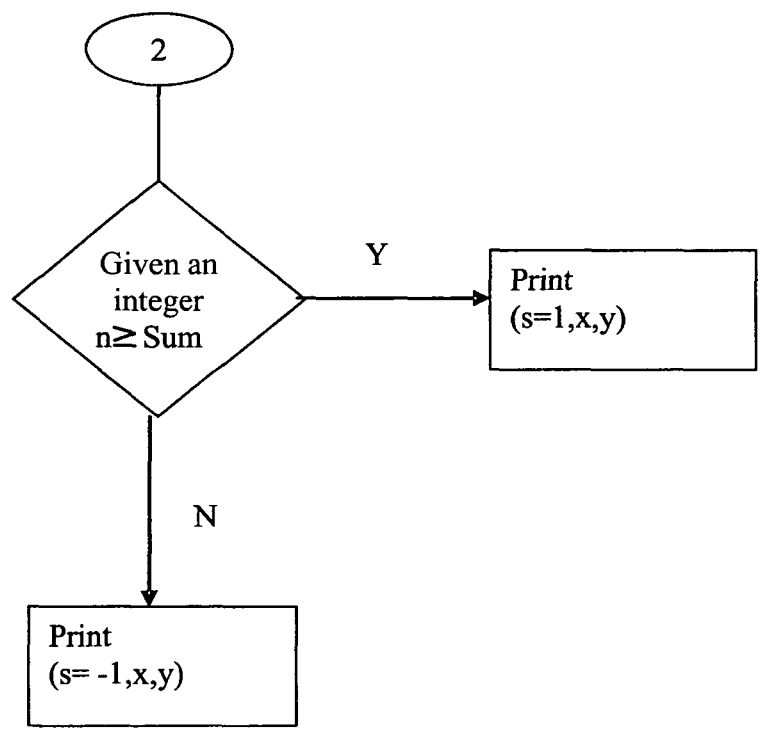
Figure 3:
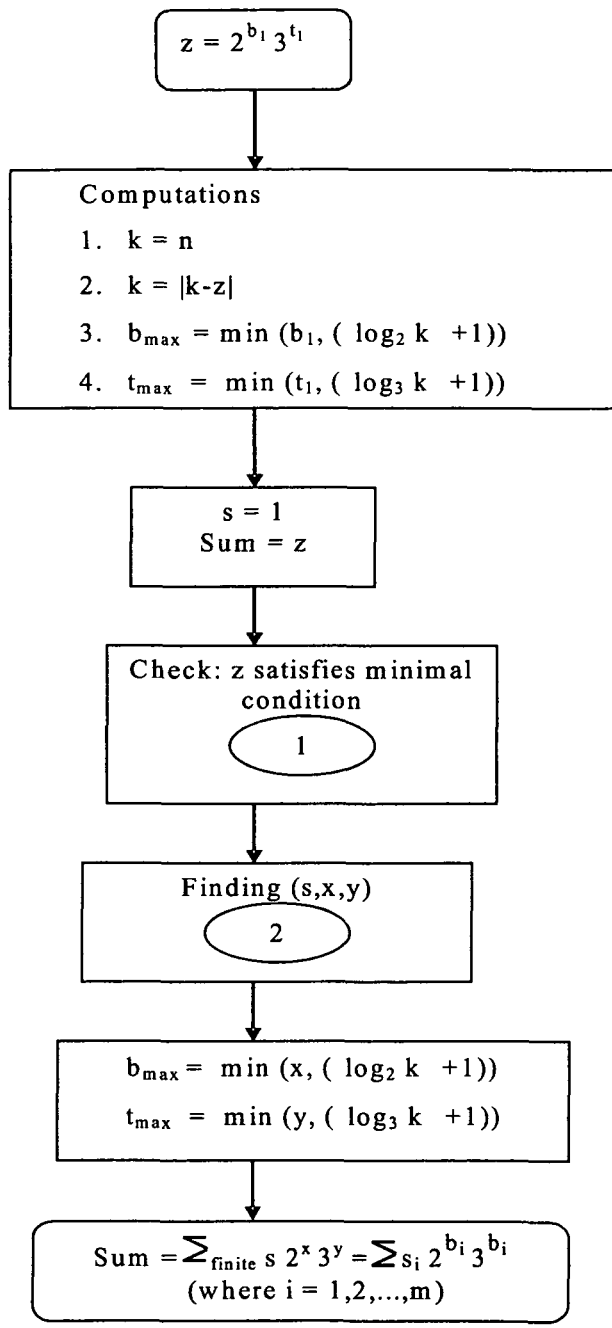
Figure 4:
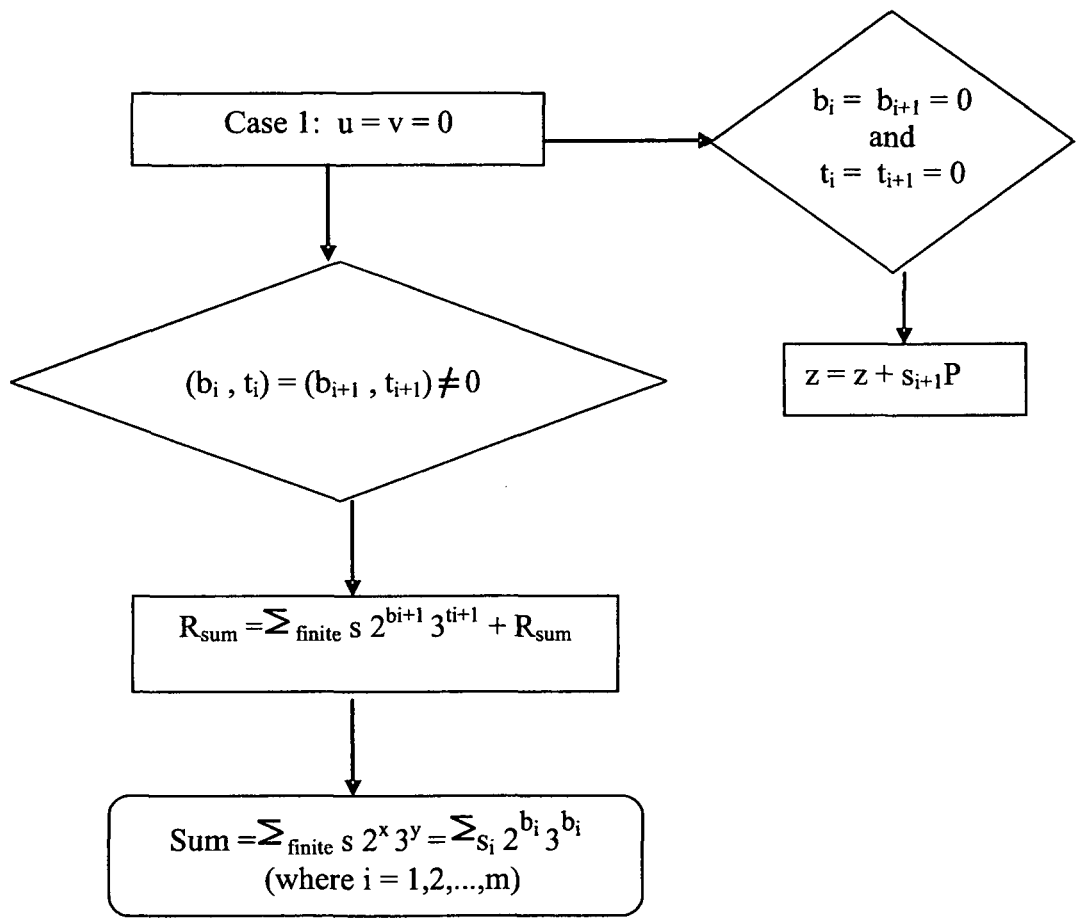
Figure 5:
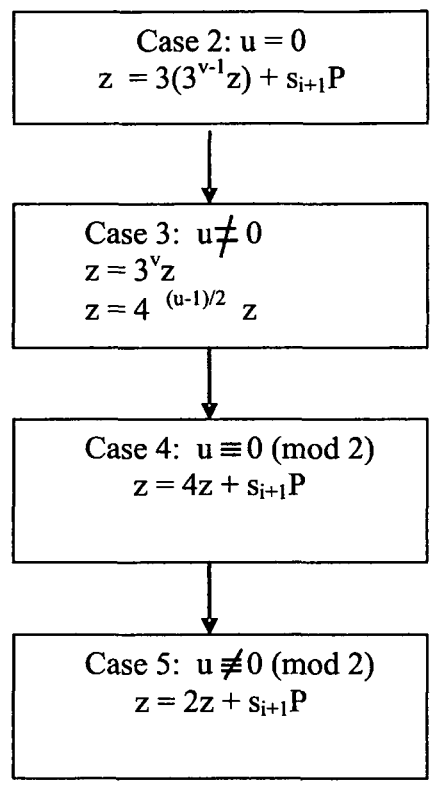
Figure 6:
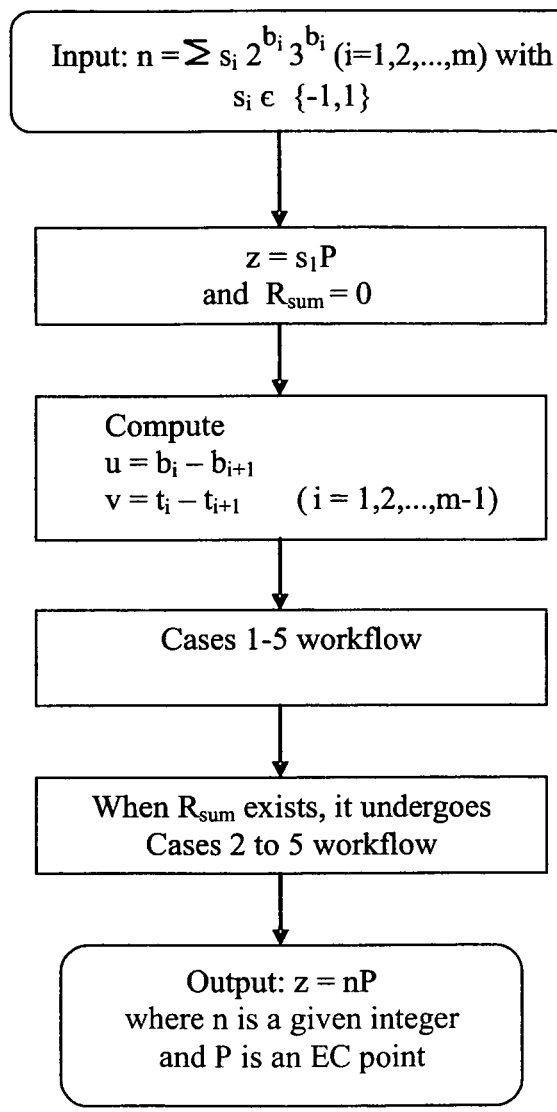
Figure 7:
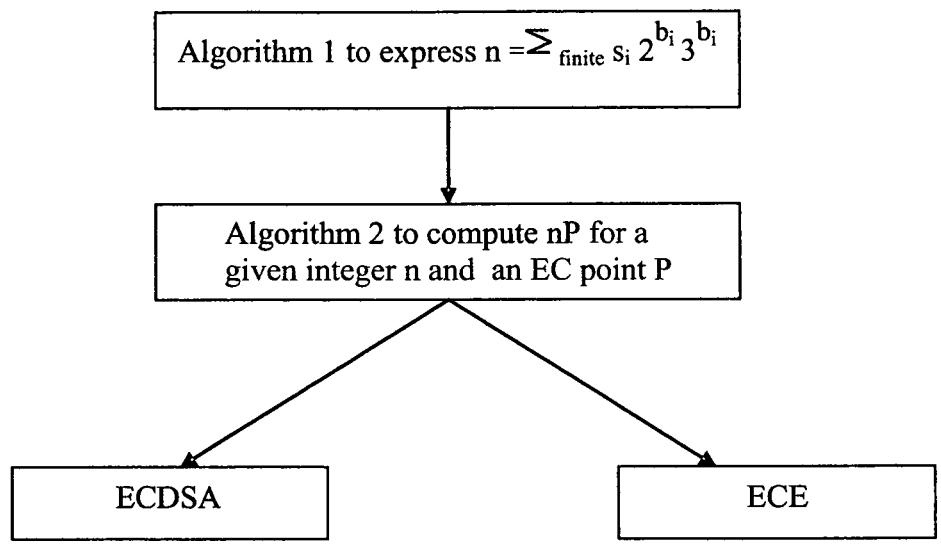

The invention is described with reference to the accompanying drawings in which;
  FIG. 1 shows that z satisfies the minimal condition;
  FIG. 2 shows to find (s,x,y);
  FIG. 3 shows to compute DBNS for Algorithm 1;
  FIG. 4 shows to compute Case 1 for Algorithm 2;
  FIG. 5 shows to compute Cases 2-5 for Algorithm 2;
  FIG. 6 shows to compute EC scalar multiplication for Algorithm 2; and
  FIG. 7 shows the applications of Algorithms 1 & 2 in ECC.

DETAILED DESCRIPTION OF ACCOMPANYING DRAWINGS

FIG. 1 shows that z satisfies the minimal condition; FIG. 2 shows to find (s,x,y); FIG. 3 shows to compute DBNS for Algorithm 1; FIG. 4 shows to compute Case 1 for Algorithm 2; FIG. 5 shows to compute Cases 2-5 for Algorithm 2; FIG. 6 shows to compute EC scalar multiplication for Algorithm 2; and FIG. 7 shows the applications of Algorithms 1 & 2 in ECC.

For elliptic curves, although DBNS representations using 2 and 3 as bases have been tried, to compute DBNS, there is no uniformity to express a number in a decreasing order.

The present invention provides a method and system to express a DBNS in decreasing order. It is used to calculate EC scalar multiplication over a finite elliptic curve. The methods involves steps for DBNS and EC scalar multiplication. These steps perform an elliptic curve E over a prime/binary field F.

Various methods of EC scalar multiplication are explained below:

The Binary method is the first known exponentiation method applied to compute EC scalar multiplication. Binary representation of a scalar enables us to interpret the multiplication as a cumulative addition of non-zero components. For example, the binary method computes 54P as 32P+16P+4P+2P.

Non-adjacent Form (NAF) method is used to compute EC scalar multiplication. This method writes any integer in terms of signed binary representation. To get fast computation for kP, NAF allows negative values in the representation set. This method is more efficient than the binary method. For example, NAF computes 15P=16P−P.

Double-base number system (DBNS) is a representation scheme in which every positive integer, n, is represented as the sum or difference of 2-integers. 2-integers are numbers of the form $2^a 3^b$. In general, an s-integer is a positive integer, whose largest prime factor does not exceed the $s^{th}$ prime number. For example, 314158 can expressed using DBNS as $2^{15}3^2+2^{11}3^2+2^8 3^1+2^4 3^1-2^1 3^0$ (all exponents of 2 and 3 are in decreasing order of exponents without repetition of summands), whereas DBNS Greedy form writes $314158=2^{15}3^2+2^{11}3^2+2^8 3^1+2^2 3^2+2^0 3^2+2^0 3^0$ not in the decreasing order of exponents.

Multiple Base Number System (MBNS) is a representation scheme in which every positive integer, n, is represented as the sum or difference of s-integers and 2-integers (where s>2), that is, numbers of the form $2^a 3^b 5^c 7^d \ldots p^t$ (where p is prime). For example, 66 can be expressed using MBNS as $2^2 3^1 5^1 + 2^1 3^1 5^0$ (all exponents of 2, 3 and 5 are in decreasing order without repetition of summands).

Public-key cryptosystems are based on problems that are considered difficult to solve. "Difficult" in this case refers more to the computational requirements in finding a solution than to the conception of the problem. These problems are called hard problems. Some of the most well known examples are factoring, theorem-proving, and the Traveling Salesman Problem.

There are two major classes of problems that interest cryptographers—P (Polynomial time) and NP (Non-deterministic polynomial time). Briefly, a problem is in P if it can be solved in polynomial time, while a problem is in NP if the validity of a proposed solution can be checked in polynomial time. Every problem in P is in NP, but we do not know whether P=NP or not.

For example, the problem of multiplying two numbers is in P. Namely, the number of bit operations required to multiply two numbers of bit length k is at most $k^2$, a polynomial. The problem of finding a factor of a number is in NP, because a proposed solution can be checked in polynomial time. However, it is not known whether this problem is in P.

Since Number theory and Cryptography are interlinked, there are some hard problems in number theory, which have directly links with ECC. Let us start with a hard problem identified by us in DBNS that computing the best approximation of a given integer n, expressed as $n=\Sigma_{finite}\ 2^i 3^j$ with decreasing order of exponents is difficult. For instance, n=100 can be expressed as 402 different DBNS expressions. It is really a tough job to find out an efficient method for this hard problem. This invention envisages a method and apparatus for DBNS, which expresses any integer n in the form of DBNS with decreasing order of exponents. The proposed algorithm writes $n=13225=2^1 3^8+2^0 3^4+2^0 3^3-2^0 3^1-2^0 3^0-2^0 3^0$ with some repeated summands. Still the research problem is open that a given n can be expressed as an optimal DBNS form with decreasing order of exponents and no repetition of summands.

In accordance with this invention there is provided a method and system to compute DBNS with decreasing order of exponents (FIG. 3). In accordance with the method of the invention, the output (DBNS sum) sometimes consists of repetition of summands (order of exponents). It is mathematically proved that suppose there exists some summands with repetitions, each summand never appears more than twice.

To compute EC scalar multiplication, this invention envisages an efficient method and system using the DBNS sum. After obtaining the output from Algorithm 1 (FIG. 1), the DBNS sum is used to compute EC scalar multiplication. It follows that the invented steps of the method for EC scalar multiplication computes $R_{sum}$ separately when the given DBNS sum consists of repeated exponents. It is an important thing to note that the $R_{sum}$ takes only one repeated summand at a time for each repeated exponent. When there is no repeated summands in the given DBNS sum, the method considers $R_{sum}=0$. The proposed EC scalar multiplication method (Algorithm 2, FIG. 6), produces the output z, known as nP. With the invention of Algorithms 1 & 2, the performance of ECDSA and ECE has been good (FIG. 7).

Let us take 980 expressed as $2^5 3^3+2^3 3^2+2^3 3^1+2^2 3^1+2^2 3^0+2^1 3^0+2^1 3^0$ using Algorithm 1. Then 980P can be computed using Algorithm 2. Similarly, we can express $240=2^4 3^2+2^3 3^2+2^2 3^1+2^2 3^1$ and $24=2^1 3^2+2^1 3^1-2^0 3^0$. It is clear that Algorithm 1 allows sometimes repetition of summands, but each summand never appears more than two.

Our Algorithm 1 computes $145673465=2^{16} 3^7+2^{10} 3^7+2^7 3^6+2^4 3^6+2^3 3^5-2^1 3^4-2^0 3^2-2^0 3^1-2^0 3^0$ with 9 summands in decreasing order of exponents (without repetition). Similarly, $841232=2^7 3^8+2^1 3^6-2^0 3^3-2^0 3^2+2^0 3^0+2^0 3^0$ with 6 summands in decreasing order of exponents with repetition. Note that Algorithm 1 produces better DBNS representation and reduced complexity. However, it seems impossible to determine an optimal DBNS representation for a given integer n.

Given an integer n, we can express n in the form of DBNS—a deterministic polynomial time problem. This result is proved using transcendental number theory and exponential Diophantine equations. To compute the best approximation of n in DBNS (decreasing order), it is not yet proven in the complexity class of P. For instance, n=1000 has 1295579 DBNS in which it will be a difficult task to find the best one in decreasing order without repetition of summands.

Implementation Results

Using the method and system in accordance with this invention e the DBNS representation and tested Algorithm 1 for various large size numbers.

TABLE 1

DBNS sum using Algorithm 1

| Value of n | Total no. of summands in DBNS | No. of summands with repetition |
|---|---|---|
| 343894 | 5 | 0 |
| 5678904 | 4 | 0 |
| 14678913 | 9 | 0 |
| 32113131231342342344344142 | 23 | 0 |
| $2^{192}-1$ | 59 | 10 (2 × 5) |
| $2^{256}-1$ | 97 | 30 (2 × 15) |
| $2^{512}-1$ | 190 | 50 (2 × 25) |

INDUSTRIAL APPLICATIONS

The method and apparatus of this invention has a number of applications in ECDSA and ECE. Some specific areas where this invention can be applied are:

1. Digital Signatures through Smart Cards: A smart card employing the implementation of ECDSA using Algorithms 1 & 2 can be used for secure signing of electronic documents such as tax forms, airline reservations etc.
2. Authentication of connection to a remote host: Certain web transactions such as banking and e-commerce need to be authenticated at the server-end. This has been achieved by establishing an SSL connection between the client and server using ECC.
3. Key Generation: This invention can also be used for the secure generation of a public/private ECC key pair. The private key is stored inside the card and never leaves the card thus providing the most secure storage of private keys. The public key is output to the terminal that the card is attached to and is used for generating a certificate.
4. Symmetric Key Generation: Using public key cryptography to encrypt messages is usually inefficient compared to symmetric key techniques. For this reason, when two parties want to set up a secure communication channel, they use their public/private key pairs to generate a symmetric key through some session key generation protocol such as Elliptic Curve Diffie-Hellman key exchange. This invention can be adapted to facilitate this session key generation.

While considerable emphasis has been placed herein on the components and component parts of the preferred embodiments, it will be appreciated that many embodiments can be made and that many changes can be made in the preferred embodiments without departing from the principles of the invention. These and other changes in the preferred embodiment as well as other embodiments of the invention will be apparent to those skilled in the art from the disclosure herein, whereby it is to be distinctly understood that the foregoing descriptive matter is to be interpreted merely as illustrative of the invention and not as a limitation.

EXPANSION OF TERMS USED

DBNS—Double Base Number System
MBNS—Multiple Base Number System
ECC—Elliptic Curve Cryptography
ECDSA—Elliptic Curve Digital Signature Algorithm
ECE—Elliptic Curve Encryption (ECE)
NAF—Non-adjacent Form

The invention claimed is:

1. A method for using a computing device including a processor and a memory, the method for performing Elliptic curve scalar multiplication in cryptography comprising the following steps:
   (a) receiving, into the memory from a source external to the memory, a Double Base Number System (DBNS) sum;
   (b) computing, using the processor, $R_{sum}$ from the DBNS sum, wherein the computing of the $R_{sum}$ from the DBNS sum is performed separately and one at a time if the DBNS sum includes repeated exponents; and
   (c) determining, using the processor, a point $nP \in E(F)$, where $E(F)$ is an elliptic curve over a prime/binary field F,
   wherein the DBNS sum includes a decreasing order of exponents, and
   wherein step (a) includes the step of receiving an input of integer $n = \Sigma \text{finite } S\, 2^x 3^y = \Sigma S_i\, 2^{b_i} 3^{b_i}$, $(i=1, 2, \ldots, m)$ with $s_i \in \{-1,1\}$, and such that $b_1 \geq b_2 \geq \ldots \geq b_m \geq 0$, and $t_1 \geq t_2 \geq \ldots \geq t_m \geq 0$; and wherein step (c) includes the step of computing the values of $u = b_i - b_{i+1}$ and $v = t_i - t_{i+1}$ when the values of i are taken as $1, 2, \ldots, m-1$.

2. The method as claimed in claim 1 wherein output z is denoted by $s_1 P$ and the value of $R_{sum=0}$.

3. The method as claimed in claim 1 wherein u is denoted by $(b_i - b_{i+1})$ and v by $(t_i - t_{i+1})$.

4. The method as claimed in claim 1 wherein the step of receiving an input of integer $n = \Sigma \text{finite } S\, 2^x 3^y = \Sigma S_i\, 2^{b_i} 3^{b_i}$, $(i=1, 2, \ldots, m)$ with $s_i \in \{-1,1\}$, such that $b_1 \geq b_2 \geq \ldots \geq b_m \geq 0$, and $t_1 \geq t_2 \geq \ldots \geq t_m \geq 0$; and the step of computing the values of $u = b_i - b_{i+1}$ and $v = t_i - t_{i+1}$ when the values of i are taken as $1, 2, \ldots, m-1$ further includes the step of computing the value of z for various values of u and v and determining value of z as $z + s_{i+1} P$ when $u = v = 0$ and $b_i - b_{i+1} = 0$ and $t_i - t_{i+1} = 0$.

5. The method as claimed in claim 1 wherein the step of receiving an input of integer $n = \Sigma \text{finite } S\, 2^x 3^y = \Sigma S_i\, 2^{b_i} 3^{b_i}$, $(i=1, 2, \ldots, m)$ with $s_i \in \{-1,1\}$, such that $b_1 \geq b_2 \geq \ldots \geq b_m \geq 0$, and $t_1 \geq t_2 \geq \ldots \geq t_m \geq 0$; and the step of computing the values of $u = b_i - b_{i+1}$ and $v = t_i - t_{i+1}$ when the values of i are taken as $1, 2, \ldots, m-1$ further includes the step of computing the value of z for various values of u and v and determining value of z as $z + s_{i+1} P$ when $u = v = 0$ and $b_i - b_{i+1} = 0$ and $t_i - t_{i+1} = 0$ and further includes the step of computing $R_{sum} = \Sigma \text{finite } S\, 2^{bi+1} 3^{ti+1} + R_{sum}$ when $(b_i, t_i) = (b_{i+1}, t_{i+1}) \neq 0$.

6. The method as claimed in claim 1 wherein the step of receiving an input of integer $n = \Sigma \text{finite } S\, 2^x 3^y = \Sigma S_i\, 2^{b_i} 3^{b_i}$, $(i=1, 2, \ldots, m)$ with $s_i \in \{-1,1\}$, such that $b_1 \geq b_2 \geq \ldots \geq b_m \geq 0$; and the step of computing the values of $u = b_i - b_{i+1}$ and $v = t_i - t_{i+1}$ and when the values of i are taken as $1, 2, \ldots, m-1$ further includes the step of computing the value of z for various values of u and v and further includes the step of determining value of z as $3(3^{v-1} z) + s_{i+1} P$ when $u = 0$.

7. The method as claimed in claim 1 wherein the step of receiving an input of integer $n = \Sigma \text{finite } S\, 2^x 3^y = \Sigma S_i\, 2^{b_i} 3^{b_i}$, $(i=1, 2, \ldots, m)$ with $s_i \in \{-1,1\}$, such that $b_1 \geq b_2 \geq \ldots b_m \geq 0$, and $t_1 \geq t_2 \geq \ldots \geq t_m \geq 0$; and the step of computing the values of $u = b_i - b_{i+1}$ and $v = t_i - t_{i+1}$ when the values of i are taken as $1, 2, \ldots, m-1$ further includes the step of computing the value of z for various values of u and v and further includes the step of determining value of z as z as $z \leftarrow 3^v z$ and $z \leftarrow 4[(u-1)/2]z$ when $u \neq 0$.

8. The method as claimed in claim 1 wherein the step of receiving an input of integer $n = \Sigma \text{finite } S\, 2^x 3^y = \Sigma S_i\, 2^{b_i} 3^{b_i}$, $(i=1, 2, \ldots, m)$ with $s_i \in \{-1,1\}$, such that $b_1 \geq b_2 \geq \ldots \geq b_m \geq 0$, and $t_1 \geq t_2 \geq \ldots \geq t_m \geq 0$; and the step of computing the values of $u = b_i - b_{i+1}$ and $v = t_i - t_{i+1}$ when the values of i are taken as $1, 2, \ldots, m-1$ further includes the step of computing the value of z for various values of u and v and further includes the step of determining value of z as $z \leftarrow 4z + s_{i+1} P$ when $u \equiv 0 \pmod 2$.

9. The method as claimed in claim 1 wherein the step of receiving an input of integer $n = \Sigma \text{finite } S\, 2^x 3^y = \Sigma S_i\, 2^{b_i} 3^{b_i}$, $(i=1, 2, \ldots, m)$ with $s_i \in \{-1,1\}$, such that $b_1 \geq b_2 \geq \ldots \geq b_m \geq 0$, and $t_1 \geq t_2 \geq \ldots \geq t_m \geq 0$; and the step of computing the values of $u = b_i - b_{i+1}$ and $v = t_i - t_{i+1}$ when the values of i are taken as $1, 2, \ldots, m-1$ further includes the step of computing the value of z for various values of u and v and further includes the step of determining value of z as $z \leftarrow 2z + s_{i+1} P$ when $u \not\equiv 0 \pmod 2$.

10. The method as claimed in claim 1 wherein the value of $R_{sum}$ is calculated separately when the given DBNS sum consists of repeated exponents.

11. The method as claimed in claim 1 wherein $R_{sum}$ assumes only one repeated summand at a time for each repeated exponent.

12. The method as claimed in claim 1 herein when there is no repeated summands in the given DBNS sum, $R_{sum}$ is considered as zero.

* * * * *